UNITED STATES PATENT OFFICE.

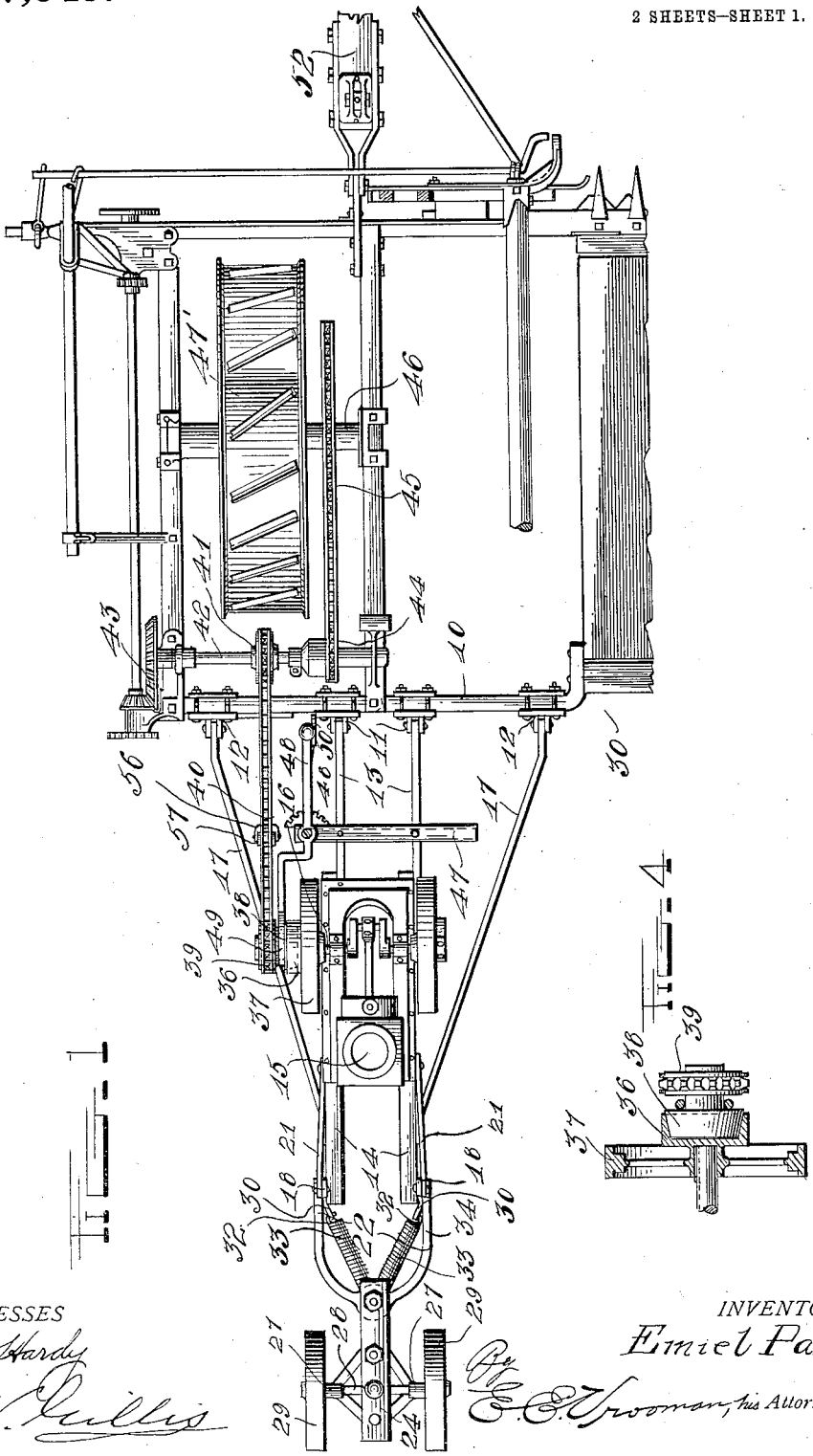

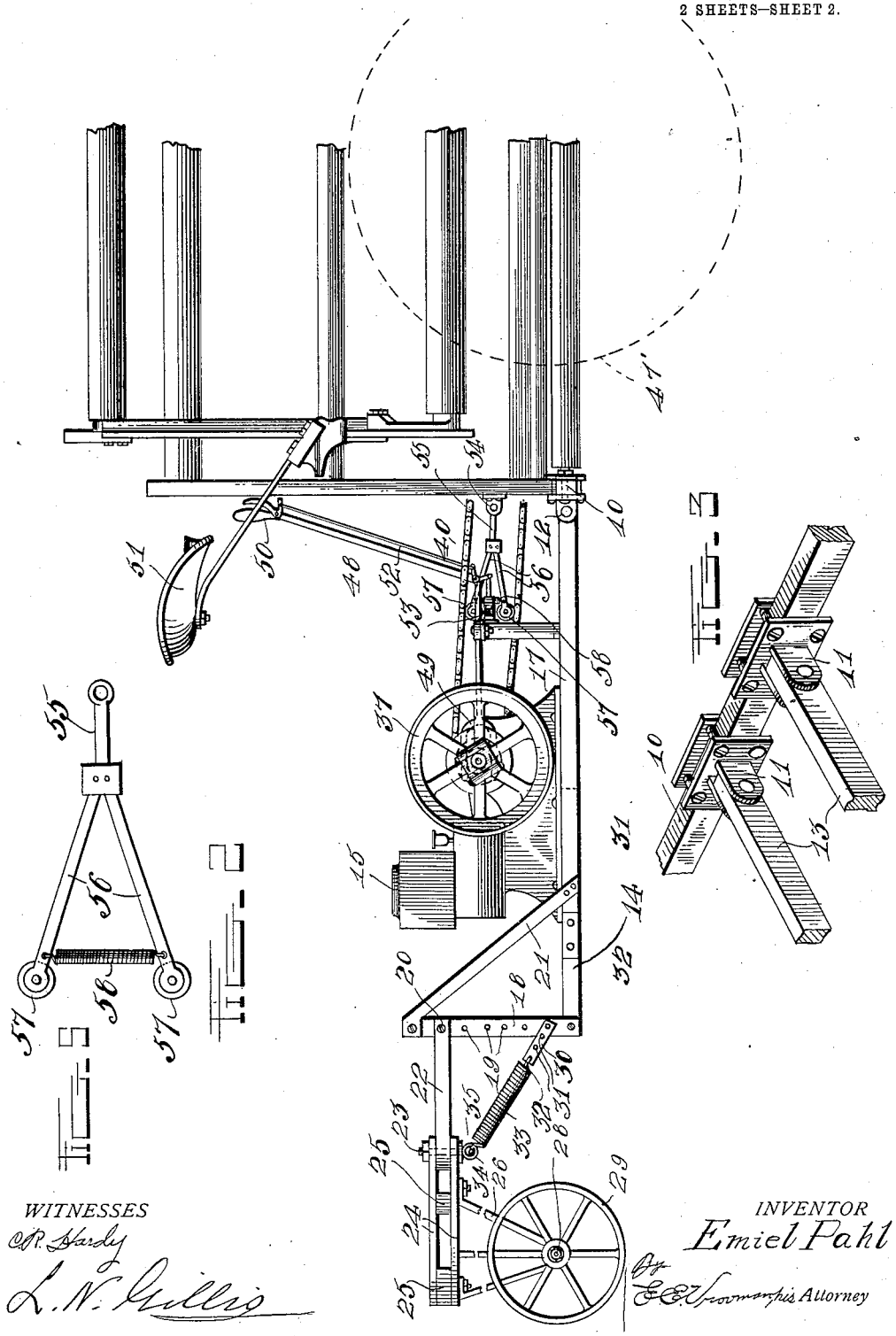

EMIEL PAHL, OF SISTER BAY, WISCONSIN.

PLATFORM FOR ENGINES.

1,077,549.  Specification of Letters Patent.  Patented Nov. 4, 1913.

Application filed May 27, 1912. Serial No. 700,093.

*To all whom it may concern:*

Be it known that I, EMIEL PAHL, a citizen of the United States, residing at Sister Bay, in the county of Door and State of Wisconsin, have invented certain new and useful Improvements in Platforms for Engines, of which the following is a specification, reference being had therein to the accompanying drawing.
This invention relates to agricultural machinery and has special reference to a platform adapted to be attached to a harvester or the like for the purpose of carrying an engine to drive the harvester.
The principal object of the invention is to provide a form of platform which can be attached to any design of harvester.

A second object of the invention is to provide a platform adapted for connection to a harvester and which is adjustable to various heights.

With the above and other objects in view, this invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and Figure 1 is a plan view of a portion of a harvester with the platform and engine applied thereto. Fig. 2 is a side elevation of the platform as applied. Fig. 3 is a detail perspective of the manner in which certain bars are attached to the rear transverse frame bar of the harvester. Fig. 4 is a detail section through a certain clutch used in connection with this platform. Fig. 5 is a detail side view of a portion of the belt tightener.

It is to be noted that the device in question is intended to be connected at one side of the harvester and in the present instance the same is shown as connected to the left side thereof, the cutter blades being located to the right.

It is further to be understood that only a portion of the harvester is disclosed herewith since the harvester itself forms no specific part of the invention.

All harvesters are provided with a rear frame member 10 and upon this rear frame member there is attached pairs of spaced ears 12. Secured to the ears 12 and extending rearwardly therefrom are longitudinal frame members 13, which have their forward ends pivoted between the pairs of ears. To the rear of these frame members 13 are attached longitudinal members 14 whereto may be bolted the base of an engine 15 of any desirable type, the engine being preferably provided with a driving shaft 16. Between the pairs of ears 12 are pivoted the horizontally diagonal brace members 17, the other ends of these members being connected to the members 14 in any suitable manner.

Extending upward from the rear ends of the members 14 are uprights 18 which are provided with a series of spaced openings 19 for the reception of adjusting bolts 20. The upper ends of the members 18 are braced to the members 13 by braces 21 and attached to the members 18 by the bolts 20 is a substantially U-shaped yoke 22. This yoke is provided at the center of its bight with a suitable opening for the reception of a bolt 23 and to this bolt is pivoted a pair of members 24, one of the members lying above and the other below the yoke 22. These members are held apart by suitable spacers 25, and depending from the members 24 are standards 26 which serve to support journal boxes 27 wherethrough passes a shaft 28 carrying the wheels 29.

To the members 18 there is secured a pair of clips 30, each of which has a series of openings 31 made therethrough. In a selected opening 31 of each clip is held the hook end 32 of a spring 33 provided on its other end with an eye 34 which engages an eye 35 on the bolt 23. By this means the rear truck is yieldably connected so as to rise and fall within certain limits and accommodate itself to the inequalities of the ground.

Mounted upon the shaft 16 is a clutch member 36 which is keyed or otherwise fixedly secured to the fly wheel 37 of the engine and this clutch member is adapted to be engaged by a clutch member 38 preferably formed integral with the sprocket gear 39 carrying a sprocket chain 40 which connects the sprocket wheel 39 with a similar gear 41 carried on the main drive shaft 42 with which harvesters are commonly equipped.

Through suitable gearing, indicated in general at 43, this drive shaft is adapted to drive the cutter mechanism of the harvester. Upon the shaft 42 may also be mounted, if desired, a sprocket 44 which is connected by a chain 45 with a sprocket wheel fixed upon the axle 46 which supports the ground wheel 47' of the harvester.

In order to show the clutch members into and out of engagement there is provided a transverse frame member 47 whereto is pivoted a lever 48 which is provided with a forked end 49. This forked end 49 engages around the hub of the clutch member 38 between the same and the sprocket gear 39 so that as the lever is moved in one direction or the other the members 36 and 38 will be engaged or disengaged as the case may be. This lever 48 is provided with a handle 50 which extends upward to a convenient position adjacent the driver's seat 51. The lever 48 is furthermore provided with the usual latch 52 and on the frame is mounted a quadrant 53 which said latch engages.

In order to keep the belt tight there is attached to the frame of the harvester an eye 54 having an arm 55 pivoted thereto and pivoted to the outer end of this arm is a pair of arms 56 each carrying a belt tightener 57, said belt tightening rollers bearing on the innerside of the belt 40 and being held firmly pressed thereagainst by means of a suitable coil spring 58.

The harvester when used with this device is preferably provided with means for attaching a draft pole 52 so that if desired the chain 45 may be removed and draft animals used to draw the harvester from place to place while the engine may be used to run the cutting mechanism.

Having thus described the invention, what is claimed as new, is:—

1. In a device of the kind described, a platform comprising a pair of longitudinal frame members having their forward ends adapted for pivotal connection to a harvester, a pair of laterally diverging brace members having their forward ends similarly attached and their rear ends fixedly connected to the longitudinal members, uprights at the rear ends of said longitudinal members provided with means for pivotally attaching a yoke adjustably thereto, a yoke attached to said uprights by said means, a supplementary frame, a vertically disposed pivot connecting the yoke and the supplementary frame, standards extending below the supplementary frame, ground wheels carried by said standards, and means to prevent upward movement of the yoke at its rear end.

2. In a device of the kind described, a platform comprising a pair of longitudinal frame members having their forward ends adapted for pivotal connection to a harvester, a pair of laterally diverging brace members having their forward ends similarly attached and their rear ends fixedly connected to the longitudinal members, uprights at the rear ends of said longitudinal members provided with means for pivotally attaching a yoke adjustably thereto, a yoke attached to said uprights by said means, a supplementary frame, a vertically disposed pivot bolt connecting the yoke and the supplementary frame, standards extending below the supplementary frame, ground wheels carried by said standards, and a plate having a series of openings spaced thereon, a bolt passing through one of said openings and one of the uprights, and a spring having one end connected to said plate and the other to the pivot bolt.

In testimony whereof I hereunto affix my signature in presence of two witnesses.

EMIEL PAHL.

Witnesses:
 MATT ROESER,
 L. LERNER.

Copies of this patent may be obtained for five cents each, by addressing the "Commissioner of Patents, Washington, D. C."